No. 679,525. Patented July 30, 1901.
M. M. BROPHY.
COCK OR VALVE.
(Application filed Mar. 21, 1901.)
(No Model.) 2 Sheets—Sheet 1.
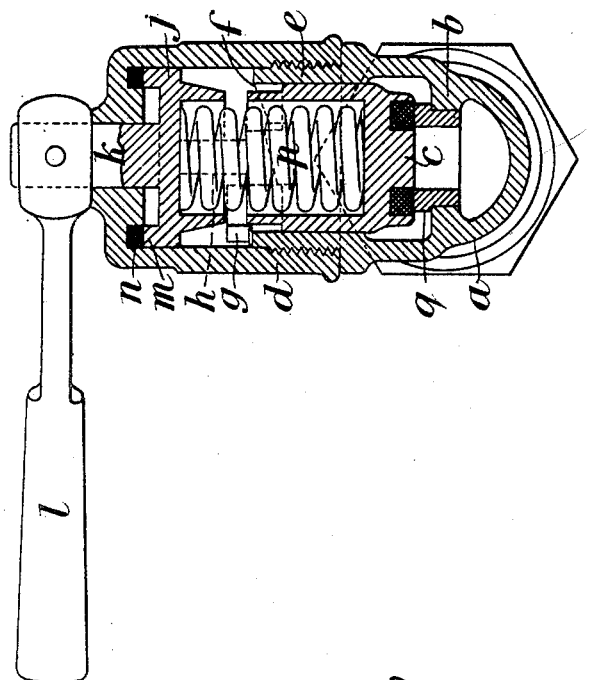
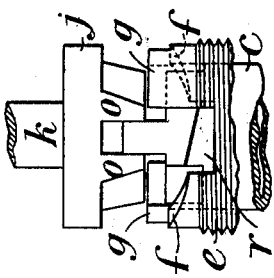
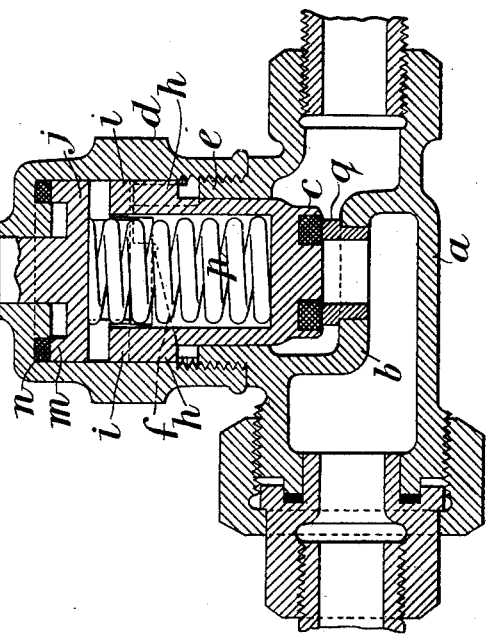
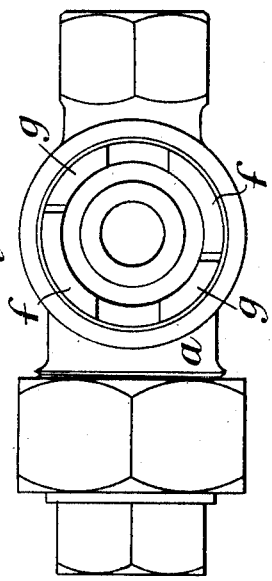
Witnesses Inventor No. 679,525. Patented July 30, 1901.
M. M. BROPHY.
COCK OR VALVE.
(Application filed Mar. 21, 1901.)
(No Model.) 2 Sheets—Sheet 2.
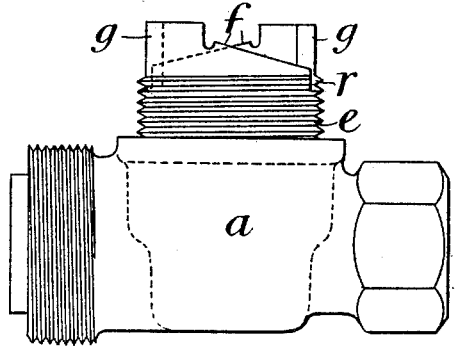
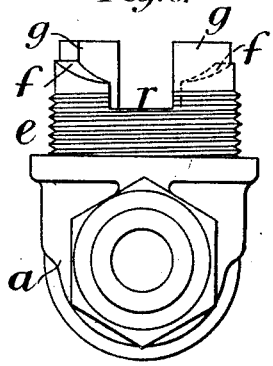
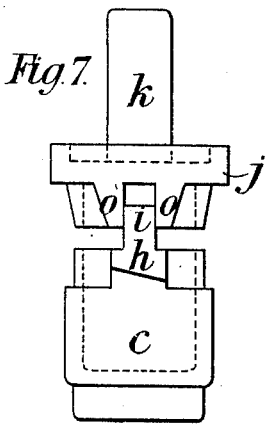
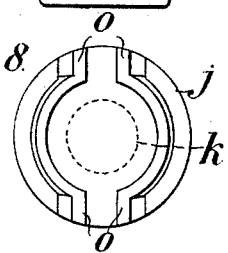
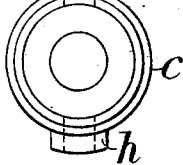
Witnesses
Inventor

UNITED STATES PATENT OFFICE.

MICHAEL MARY BROPHY, OF LONDON, ENGLAND.

COCK OR VALVE.

SPECIFICATION forming part of Letters Patent No. 679,525, dated July 30, 1901.

Application filed March 21, 1901. Serial No. 52,197. (No model.)

*To all whom it may concern:*

Be it known that I, MICHAEL MARY BROPHY, a subject of the King of Great Britain, residing at 251 High Holborn, London, England, have invented new and useful Improvements in Cocks or Valves, of which the following is a specification.

My invention relates to cocks or valves which are especially intended for use with steam or hot or cold water in connection with baths and lavatories, but are also applicable for other purposes, the object of my invention being to provide a cock which is of simple construction and which is less liable to leak than such cocks as hitherto constructed.

According to my invention I provide a shell or casing having the usual partition provided with an opening with which the valve is arranged and which is constructed with a cylindrical extension in which the valve works, the said extension being made separate from the other part of the casing and advantageously attached thereto by screwing it onto a nipple which is provided with one or more inclined surfaces at its upper end for a purpose hereinafter described.

The valve is in the form of a cylindrical cup having at its lower end a recess in which a packing-ring for making contact with the valve-seating is arranged. Above this valve, in the top of the extension, is a disk having a central spindle or stem projecting through the outer end of the extension and serving for the attachment of an operating handle or key. The disk is formed at its periphery with a flange which is adapted to bear against a packing-ring located in a recess within the extension in order to prevent the escape of water or steam and to obviate the necessity for using a gland around the stem.

On the upper outer periphery of the valve-cup are inclined surfaces adapted to lie in contact with the inclined surfaces upon the top of the central portion of the shell in such a manner that when a slight rotation is imparted to the cup the valve proper will be lifted from its seat, or vice versa. The desired rotation is imparted to the valve-cup from the disk, which is provided with teeth or projections which engage with other teeth or projections upon the upper edge of the valve-cup, sufficient space being provided to allow of the desired longitudinal movement of the latter. Stops are arranged in connection with the inclines upon the shell for limiting the movement of the valve, and consequently also of the handle, in either direction. Within the cup is arranged a spring, the lower end of which bears upon the bottom of the said cup, while the upper end bears upon the disk.

To enable the invention to be fully understood, I will describe the same by reference to the accompanying drawings, in which—

Figure 1 is a longitudinal section of a cock or valve constructed according to my invention. Fig. 2 is a transverse section of the same, and Fig. 3 is a plan view with certain parts removed. Fig. 4 is an elevation showing the relative positions of the inclines on the valve and the inclines on the shell when the valve is closed. Fig. 5 is a side view of the main part of the shell, and Fig. 6 is an end elevation of the same. Fig. 7 is an elevation of the valve proper, with its operating disk and spindle. Fig. 8 is an under side view of the operating-disk, and Fig. 9 is an under side view of the valve proper.

$a$ is the shell or casing of the valve. $b$ is the partition in the said casing.

$c$ is the valve proper, in the form of a cylindrical cup. $d$ is the box or cylindrical extension in which the said valve proper is located, and $e$ is the nipple formed upon the casing $a$ and to which the box or extension $d$ is connected by screw-threads.

$ff$ are the inclined surfaces upon the upper edge of the nipple $e$, the said inclined surfaces being formed by cutting away portions of the said nipple, so as to leave intermediate portions $g\ g$, which act as stops for the valve, as clearly shown in Figs. 3, 4, 5, and 6.

The valve $c$ is formed with lateral projecting lugs $h\ h$, Figs. 7 and 9, the under side of which are inclined and adapted to coöperate with the inclined faces $ff$ in such a manner that when a certain amount of rotation is imparted to the said valve proper the latter will be lifted from its seat. These lugs $h\ h$ have upward extensions or teeth $i\ i$.

$j$ is the disk for operating the valve, the said disk having a stem $k$, which projects through the top of the box $d$, where it is provided with an operating-handle $l$ and having upon its upper face a flange $m$, designed to press against a packing-ring $n$ in the said box for preventing the escape of water or steam. The said disk has on the opposite face the teeth or projections $o\ o$, Fig. 8, which engage the extensions $i\ i$ of the valve, the said teeth $o\ o$ being so arranged that the said extensions can slide vertically between them.

$p$ is a spring arranged within the valve $c$ and bearing at one end against the bottom of the recess within the said valve and at the other end against the face of the disk $j$, the said spring thus serving not only to press the flange $m$ of the disk against the packing-ring $n$, but also to press the valve against the seat $q$ in the partition $b$.

With the construction hereinbefore described it will be obvious that when by means of the handle $l$ the valve $c$ is rotated, so that the lugs $h\ h$ run up the inclines $f\ f$, the said valve will be lifted more or less from its seat against the pressure of the spring $p$ and that when the said handle $l$ is returned the pressure of the said spring will cause the lugs $h$ to keep in contact with the inclines $f\ f$ and thereby close the valve.

The stops $g\ g$ serve as abutments against which the lugs $h\ h$ will impinge in order to limit the rotary movement of the valve.

It will be noticed that recesses $r\ r$ are formed in the nipple $e$ immediately opposite to the positions which the lugs $h\ h$ occupy when in their normal position, as shown in Fig. 4, these recesses $r\ r$ serving to allow the said lugs to move quite clear of the inclined surfaces $f\ f$, so as to leave the valve free to be pressed against its seat under the action of the spring $p$.

Having now particularly described and ascertained the nature of my said invention and in what manner the same is to be performed, I declare that what I claim is—

1. In a cock or valve the combination with the valve-casing, of a valve proper adapted to slide longitudinally in a box or extension thereon, inclined surfaces in the said box or extension, corresponding inclined surfaces upon the valve which coöperate with the inclined surfaces in the casing, a disk provided with a stem which projects through the box or casing and with teeth which engage with the valve, the said disk being arranged in connection with packing so as to prevent the escape of steam around the stem, and a spring arranged between the disk and the valve, substantially as, and for the purpose, described.

2. In a cock or valve the combination of a casing having a partition provided with a hole adapted to be closed by the valve proper, a nipple upon the side of the said casing in which the valve slides, inclined surfaces upon the edge of the said nipple, corresponding inclined surfaces upon the valve, stops for limiting the movement of the said valve relatively with the inclined surfaces, a cap or cover secured to the nipple and inclosing the valve, a disk provided with a stem projecting through the said cover and with teeth which coöperate with teeth upon the valve and a spring which tends to force the disk and valve apart all substantially as, and for the purposes, described.

MICHAEL MARY BROPHY.

Witnesses:
JOHN E. BOUSFIELD,
C. G. REDFERN.